(12) United States Patent
Kado

(10) Patent No.: US 11,417,025 B2
(45) Date of Patent: Aug. 16, 2022

(54) INFORMATION PROCESSING APPARATUS, ARTICLE IDENTIFICATION APPARATUS, AND ARTICLE IDENTIFICATION SYSTEM

(71) Applicant: TOSHIBA TEC KABUSHIKI KAISHA, Tokyo (JP)

(72) Inventor: Takashi Kado, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 434 days.

(21) Appl. No.: 16/687,854

(22) Filed: Nov. 19, 2019

(65) Prior Publication Data
US 2020/0372681 A1     Nov. 26, 2020

(30) Foreign Application Priority Data
May 22, 2019  (JP) .............................. JP2019-096182

(51) Int. Cl.
| | |
|---|---|
| G06T 7/00 | (2017.01) |
| G06T 1/20 | (2006.01) |
| G06T 1/60 | (2006.01) |
| H04N 5/272 | (2006.01) |

(52) U.S. Cl.
CPC ................. *G06T 7/97* (2017.01); *G06T 1/20* (2013.01); *G06T 1/60* (2013.01); *H04N 5/272* (2013.01)

(58) Field of Classification Search
CPC .... G06T 7/97; G06T 1/20; G06T 1/60; G06T 3/0056; H04N 5/272; G06K 9/6256; G06V 20/00; G06V 10/247; G06V 10/20
See application file for complete search history.

(56) References Cited

U.S. PATENT DOCUMENTS

| | | | |
|---|---|---|---|
| 9,443,164 B2 | 9/2016 | Sulc et al. | |
| 2010/0205043 A1 | 8/2010 | Edwards | |
| 2012/0223943 A1 | 9/2012 | Williams et al. | |

FOREIGN PATENT DOCUMENTS

| | | |
|---|---|---|
| JP | 08-30808 | 2/1996 |
| JP | 2009-152951 | 7/2009 |

OTHER PUBLICATIONS

Extended European Search Report for European Patent Application No. 19219246.6 dated Jun. 23, 2020.
Kawai, et al. "Diminished Reality Based on Image Inpainting Considering Background Geometry", IEEE Transactions on Visualization and Computer Graphics, IEEE Service Center, Los Alamitos, CA, US, vol. 22, No. 3, Mar. 1, 2016, pp. 1236-1247, XP011597008.

*Primary Examiner* — Christopher M Brandt
(74) *Attorney, Agent, or Firm* — Amin, Turocy & Watson, LLP

(57) ABSTRACT

According to one embodiment, an information processing apparatus includes a memory and a processor. The memory stores a background image that does not include a detection target, a detection target image that is an image of the detection target, and label information that indicates the detection target of the detection target image. The processor performs trapezoid correction on the background image, generates a composite image by superimposing the detection target image on the background image subjected to the trapezoid correction, and generates learning data based on the composite image and the label information.

20 Claims, 14 Drawing Sheets

BACKGROUND IMAGE

IDENTIFICATION TARGET IMAGE

IDENTIFICATION TARGET IMAGE

INFORMATION PROCESSING APPARATUS, ARTICLE IDENTIFICATION APPARATUS, AND ARTICLE IDENTIFICATION SYSTEM

CROSS-REFERENCE TO RELATED APPLICATION

This application is based upon and claims the benefit of priority from Japanese Patent Application No. 2019-096182, filed in May 22, 2019, the entire contents of which are incorporated herein by reference.

FIELD

Embodiments described herein relate generally to an information processing apparatus, an article identification apparatus, and an article identification system.

BACKGROUND

An apparatus for identifying (labeling) a detection target (commodity, article, and the like) from an image (identification target image) in which an image of the detection target placed on a fixture having a shelf is captured based on an identification model generated in advance is put into practical use.

The identification model is generated in advance by machine learning based on learning data. Machine learning is a scheme such as a neural network used for segmentation. The learning data is data including a question and an answer. For example, in generating the identification model for identifying the detection target from an image, learning data that uses an image including the detection target as the problem and uses an area of the detection target in the image and information (label information) indicating the detection target as the answer is used. The learning data is generated, for example, by manually giving an area where the detection target exists and the label information to the image including the detection target. As such, since generation of learning data is troublesome, there is a method of generating learning data by superimposing an image (detection target image) of the detection target on a background image that does not include the detection target.

The detection target image is an image of a predetermined surface (face) of the detection target. The face of the detection target is any surface of appearance that is visible when the detection target is disposed on the fixture. For example, the detection target image is an image captured by an imaging device in a state where the imaging device faces the face of the detection target. The background image is, for example, an image of the fixture on which the detection target is not disposed and the vicinity of the fixture. There is a possibility that an angle of an optical axis of an optical system of the imaging device with respect to the fixture when capturing the background image is an angle at which the optical axis does not face the face of the detection target when the detection target is disposed on the fixture. There is a problem to be solved that the detection target image cannot be simply superimposed on the background image captured in such a state.

DETAILED DESCRIPTION

Embodiments provide an information processing apparatus, an article identification apparatus, and an article identification system capable of generating learning data used for an identification model.

In general, according to one embodiment, an information processing apparatus includes a memory and a processor. The memory stores a background image that does not include a detection target, a detection target image that is an image of the detection target, and label information that indicates the detection target of the detection target image. The processor performs trapezoid correction on the background image, generates a composite image by superimposing the detection target image on the background image subjected to the trapezoid correction, and generates learning data based on the composite image and the label information.

Hereinafter, embodiments will be described with reference to the drawings.

Figure 1:
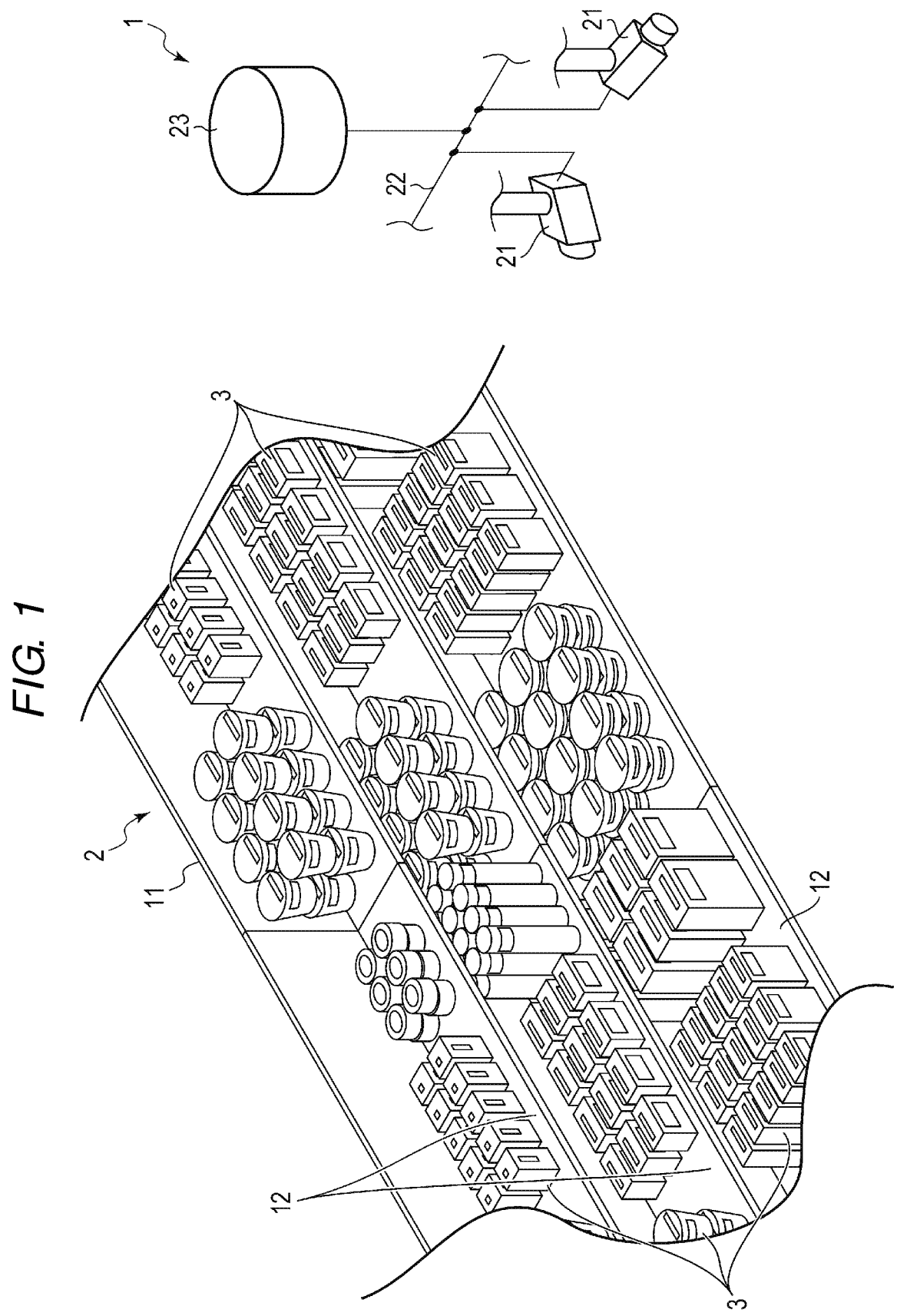
FIG. 1 is a diagram schematically illustrating a configuration example of an article identification system according to an embodiment.

FIG. 1 is an explanatory diagram for describing an example of a schematic configuration of an article identification system 1 according to an embodiment.

First, an outline of the article identification system 1 will be described.

The article identification system 1 is a system that captures an image of a fixture 2 for display installed at a predetermined location such as a store and a warehouse and an image of a commodity (article) 3 which is a detection target placed in the fixture 2 and performs a labeling process for identifying the detection target from the captured image.

The fixture 2 includes a backboard 11 and a shelf 12 protruding from the backboard 11.

The backboard 11 is a support member that supports the shelf 12. The backboard 11 is configured, for example, in a plate shape standing upright in the vertical direction.

The shelf 12 is a shelf plate that supports the commodity 3. The shelf 12 is configured to protrude from the backboard 11 in the horizontal direction, for example.

The article identification system 1 includes a commodity shelf imaging device 21 and an information processing apparatus 23 connected via a network 22.

The commodity shelf imaging device 21 is a camera including an optical system and an imaging element. The commodity shelf imaging device 21 converts light imaged by the optical system into an image (image data) by the imaging element. The commodity shelf imaging device 21 supplies the acquired image to the information processing apparatus 23. The commodity shelf imaging device 21 is configured as, for example, a monitoring camera provided in a store or warehouse where the fixture 2 is disposed. The commodity shelf imaging device 21 may be a commodity imaging camera provided in the vicinity of the fixture 2. The commodity shelf imaging device 21 may be configured as a device including a moving mechanism that moves in a store or a warehouse and a camera installed at the moving mechanism.

Figure 2:
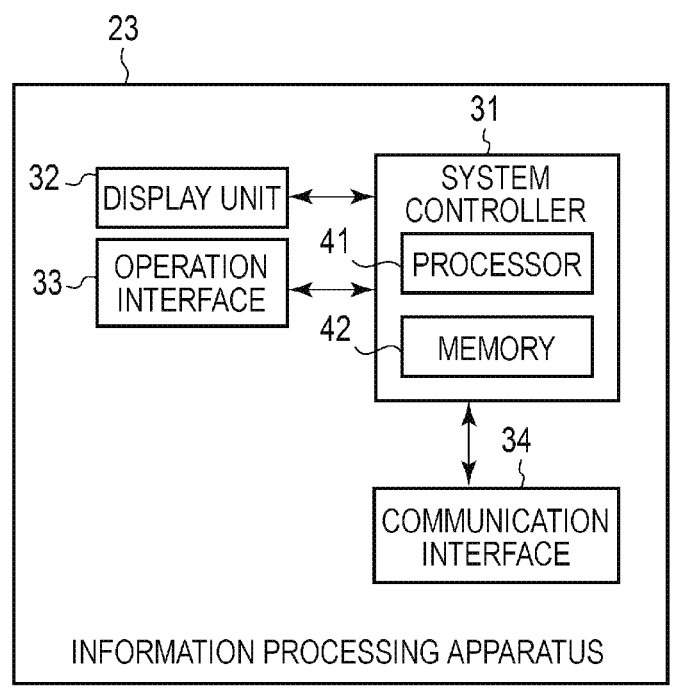
FIG. 2 is a diagram for describing a configuration example of an information processing apparatus according to the embodiment.

The information processing apparatus 23 performs object detection using machine learning. FIG. 2 is an explanatory diagram for describing a configuration example of the information processing apparatus 23. The information processing apparatus 23 includes a system controller 31, a display unit 32, an operation interface 33, and a communication interface 34.

The system controller 31 controls the information processing apparatus 23. The system controller 31 includes, for example, a processor 41 and a memory 42.

The processor 41 is a computation element that executes computation processing. The processor 41 is a CPU, for example. The processor 41 may be configured to include, for example, a CPU and a GPU. The processor 41 performs various processes based on data such as a program stored in the memory 42. The processor 41 functions as a control unit that can execute various operations by executing the program stored in the memory 42.

The memory 42 is a storage medium that stores a program and data used in the program. The memory 42 also functions as a working memory. That is, the memory 42 temporarily stores data being processed by the processor 41, a program executed by the processor 41, and the like.

The display unit 32 includes a display that displays a screen according to a video signal input from a display control unit such as the system controller 31 or a graphic controller (not illustrated). For example, on the display of the display unit 32, a screen (for example, a setting screen for a composite parameter described later) for various settings of the information processing apparatus 23 is displayed.

The operation interface 33 is connected to an operation member (not illustrated). The operation interface 33 supplies an operation signal corresponding to an operation of the operation member to the system controller 31. The operation member is, for example, a touch sensor, a ten-key, a power key, a paper feed key, various function keys, or a keyboard. The touch sensor acquires information indicating a designated position in a certain area. The touch sensor is configured as a touch panel integrally with the display unit 32, thereby allowing a signal indicating a touched position on a screen displayed on the display unit 32 to be input to the system controller 31.

The communication interface 34 is an interface for communicating with other apparatuses. The communication interface 34 is used for communication with, for example, the commodity shelf imaging device 21 and a host apparatus (external apparatus). The communication interface 34 performs wireless communication with other apparatuses according to a standard such as Bluetooth (registered trademark) or Wi-fi (registered trademark). For example, the communication interface 34 may be configured as a LAN connector or the like.

Next, an image acquired by the commodity shelf imaging device 21 will be described.

The commodity shelf imaging device 21 is generally required to capture an image over a wide range. For that reason, as an optical system of the commodity shelf imaging device 21, an optical system having a diagonal angle of view as large as possible (a focal length as short as possible) is used. For example, as the optical system of the commodity shelf imaging device 21, an optical system adopting a first projection method (for example, a so-called fish-eye projection method such as an equidistant projection method, a three-dimensional projection method, an equal solid angle projection method, or an orthographic projection method) and having a short focal length is used. In the following description, it is assumed that the optical system of the commodity shelf imaging device 21 is an optical system of the equidistant projection method.

Figure 3:
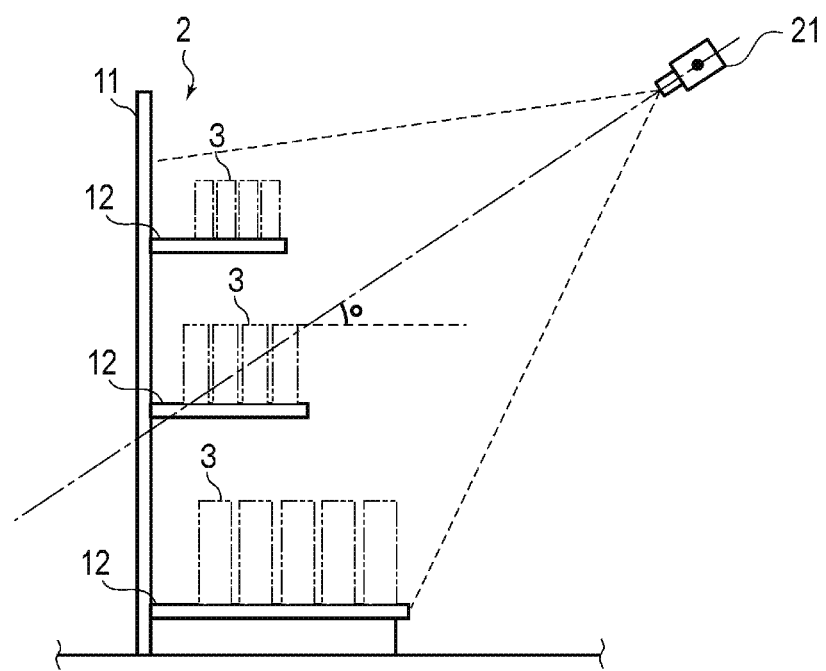
FIG. 3 is an explanatory diagram for describing an example of a state of an imaging device when capturing a background image according to the embodiment.

FIG. 3 is an explanatory diagram for describing a state of the commodity shelf imaging device 21 when capturing a background image. As illustrated in FIG. 3, the commodity shelf imaging device 21 acquires the background image by capturing the image of the fixture 2 and the vicinity thereof in a state where the commodity 3 is not disposed on the fixture 2. An angle of the optical axis of the optical system of the commodity shelf imaging device 21 with respect to the fixture 2 when capturing the background image is, as illustrated in FIG. 3, an angle that does not face the upper surface (surface on a side opposite to the surface in contact with the shelf 12) of the commodity 3 when the commodity 3 which is a detection target is placed on the fixture 2. That is, the optical system of the commodity shelf imaging device 21 forms an angle with respect to the surface on which the commodity on the shelf 12 of the fixture 2 is disposed.

Figure 4:
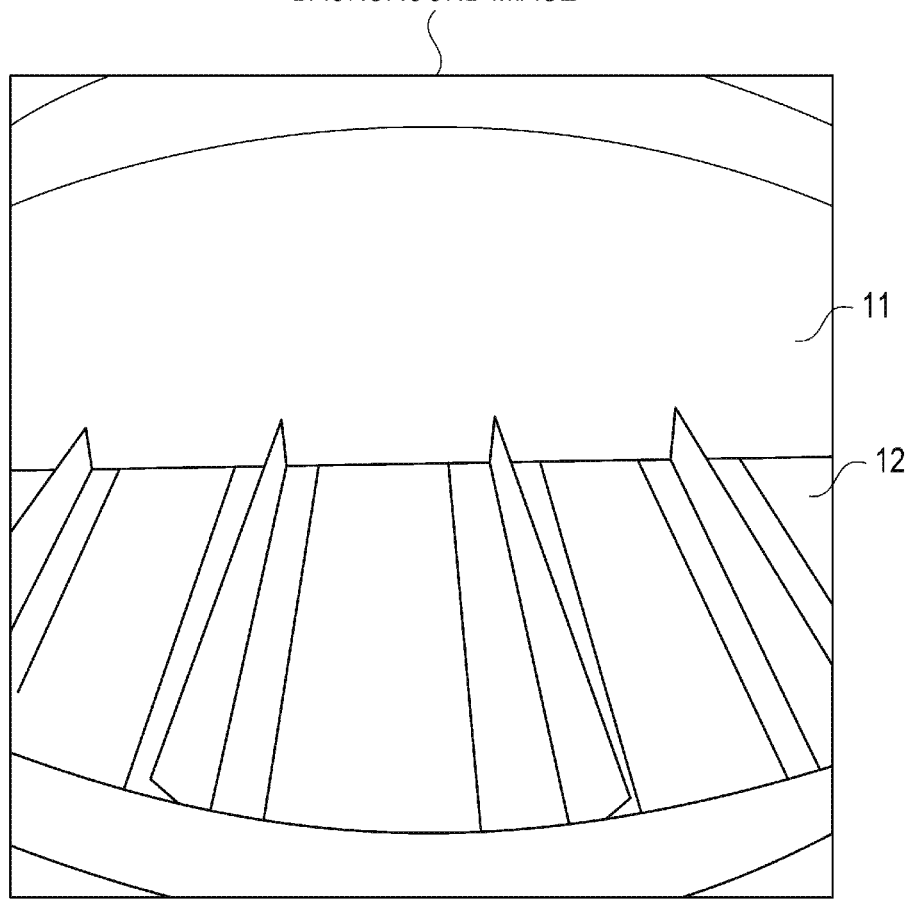
FIG. 4 is an explanatory diagram for describing the example of the background image according to the embodiment.

FIG. 4 illustrates an example of the background image captured by the commodity shelf imaging device 21 in the state illustrated in FIG. 3. The background image is an image captured by an imaging device having an optical system of the first projection method (equidistant projection method in this example). That is, the background image is an image of the equidistant projection method.

The imaging device that acquires the background image may be an imaging device different from the commodity shelf imaging device 21. The background image may be an image captured by an imaging device having an optical system of a projection method such as the three-dimensional projection method, the equal solid angle projection method, or the orthographic projection method.

The commodity shelf imaging device 21 acquires an identification target image by capturing the image of the fixture 2 and the vicinity thereof in a state where the commodity 3 is disposed on the fixture 2.

Figure 5:
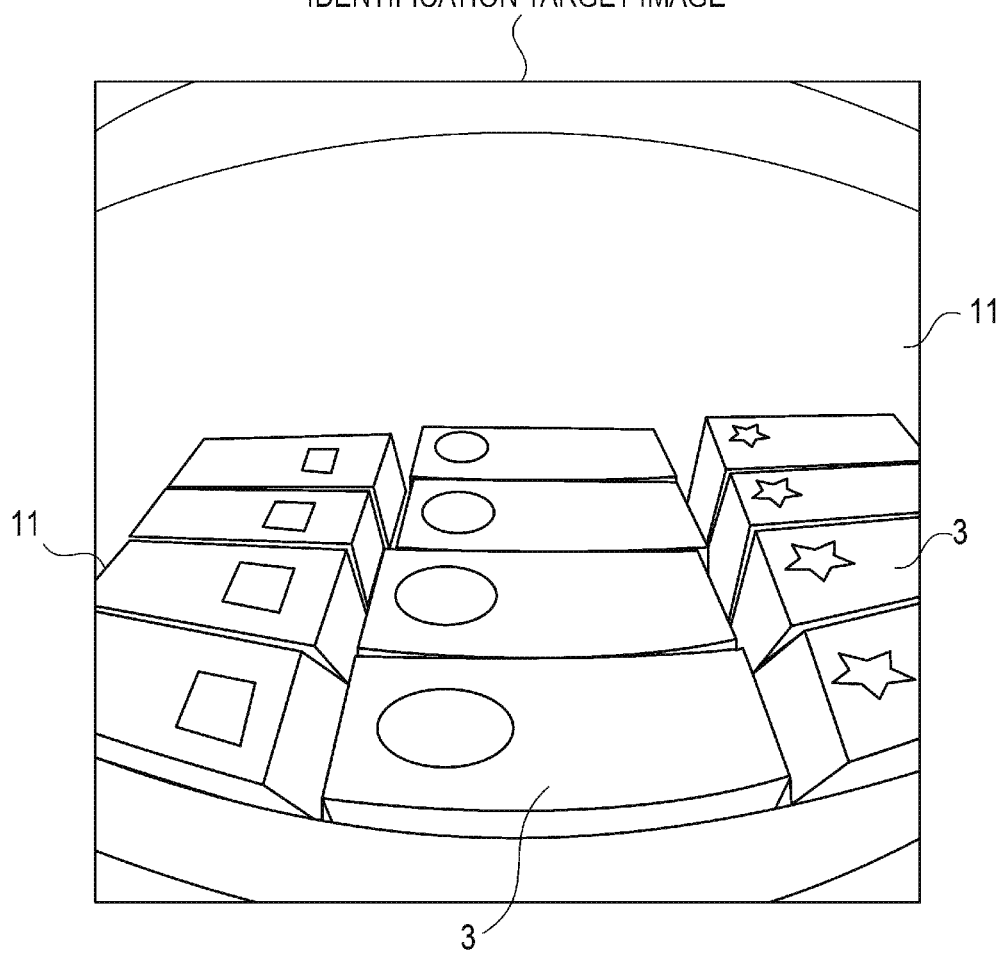
FIG. 5 is an explanatory diagram for describing an example of an identification target image according to the embodiment.

FIG. 5 illustrates an example of an identification target image captured by the commodity shelf imaging device 21 when the commodity 3 is disposed on the fixture 2 in the state of FIG. 3. The identification target image is an image captured by the imaging device having the optical system of the first projection method (equidistant projection method in this example). That is, the identification target image is an image of the equidistant projection method.

Next, an image and learning data used in the information processing apparatus 23 will be described.

The information processing apparatus 23 has an inference phase for inferring an object in an image based on an identification model generated in advance and a learning phase for generating and updating the identification model based on learning data (teaching data).

In the inference phase, the information processing apparatus 23 performs a labeling process for identifying the commodity 3 which is the detection target from the identification target image acquired by the commodity shelf imaging device 21, based on the identification model generated in advance. That is, the information processing apparatus 23 detects "where" and "what" in the identification target image by performing the labeling process based on the identification model.

In the learning phase, the information processing apparatus 23 performs machine learning processing for generating and updating the identification model by machine learning based on the learning data.

The learning data is data including a question and an answer. For example, for generation of an identification model for identifying a detection target from an image, learning data that uses an image including the detection target as the question and uses a position of the detection target in the image and information (label information) indicating the detection target as the answer is used.

For example, the labeling process is a scheme described in "SSD: Single Shot MultiBox Detector (see https://arxiv.org/abs/1512.02325)". In this scheme, an identification model is generated by machine learning based on learning data including an image, bounding box information indicating a position in the image, and label information selected from a finite number of classes.

The information processing apparatus 23 generates learning data by superimposing an image (detection target image) of the detection target on the background image acquired in advance.

The detection target image is an image of a predetermined surface of a commodity that is a detection target. This predetermined surface is referred to as a face. The face is any surface of appearance that is visible when the commodity is disposed on the fixture 2. In this example, description will be made assuming that the upper surface (surface on aside opposite to the surface in contact with the shelf 12) of the commodity 3 disposed on the shelf 12 of the fixture 2 is the face.

Figure 6:
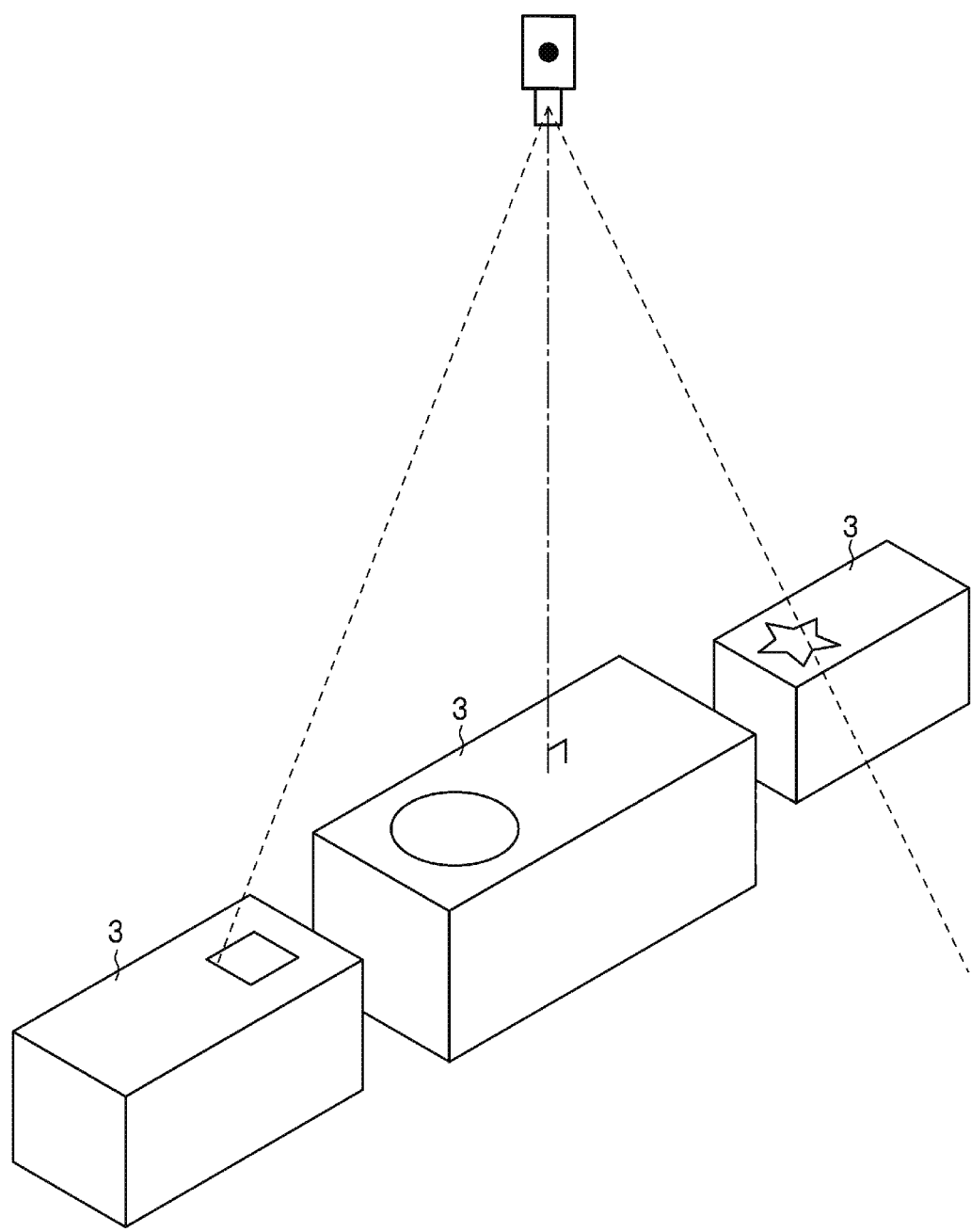
FIG. 6 is an explanatory diagram for describing an example of a state of the imaging device when capturing a detection target image according to the embodiment.

FIG. 6 is an explanatory diagram for describing a state of the imaging device when capturing the detection target image. The imaging device captures the commodity 3 with the imaging device having the optical system of the second projection method (for example, the central projection method) in a state where the imaging device is facing the face of the commodity 3, thereby acquiring the detection target image. More specifically, as illustrated in FIG. 6, the detection target image is an image captured by the imaging device in a state where the optical axis of the optical system of the imaging device is orthogonal to the face of the commodity 3.

Figure 7:
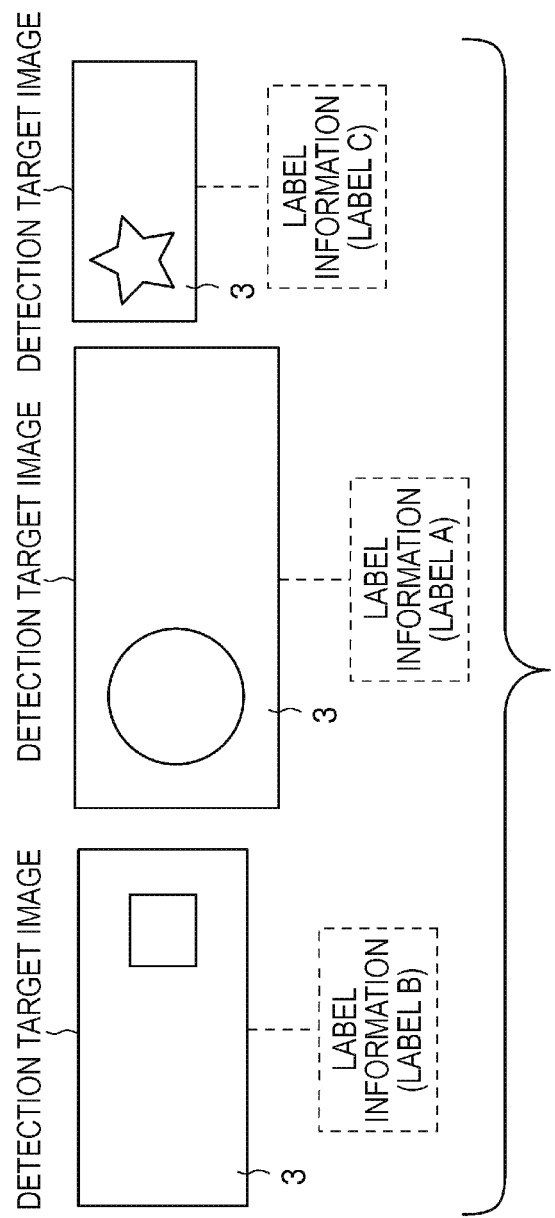
FIG. 7 is an explanatory diagram for describing an example of the detection target image according to the embodiment.

FIG. 7 illustrates an example of a detection target image captured by the imaging device in the state illustrated in FIG. 6. The detection target image is a rectangular image captured by the imaging device having the optical system of the second projection method (in this example, the central projection method). That is, the detection target image is an image of the central projection method. The detection target image is an image in which an area of the face of the commodity 3 is trimmed and an area outside the face is removed. Also, label information is given to the detection target image. The label information is given to the detection target image when capturing the detection target image. The label information may be given collectively or individually to the detection target images that are captured and stored.

For example, the imaging device that acquires the detection target image is an imaging device different from the commodity shelf imaging device 21. The imaging device that acquires the detection target image may be the commodity shelf imaging device 21.

Next, the operation of the information processing apparatus 23 in the learning phase will be described.

As described above, in the learning phase, the information processing apparatus 23 performs a machine learning process for generating and updating the identification model by machine learning, based on the learning data. For that purpose, the information processing apparatus 23 first generates learning data.

The detection target image cannot be simply superimposed on the background image captured under the conditions described above. This is because of a difference in the projection method between the background image and the detection target image and a difference in image height due to a difference in distance from the optical axis on an imaging surface. For that reason, the information processing apparatus 23 converts the background image by image processing and superimposes the detection target image on the converted background image, thereby generating learning data.

The processor 41 of the system controller 31 of the information processing apparatus 23 acquires a plurality of background images in advance and stores the plurality of background images in the memory 42. The processor 41 acquires a plurality of detection target images to which label information is assigned in advance and stores the plurality of detection target images in the memory 42. The processor 41 acquires parameters (composite parameters) used for image processing for the detection target image in advance and stores the parameters in the memory 42.

Figure 8:
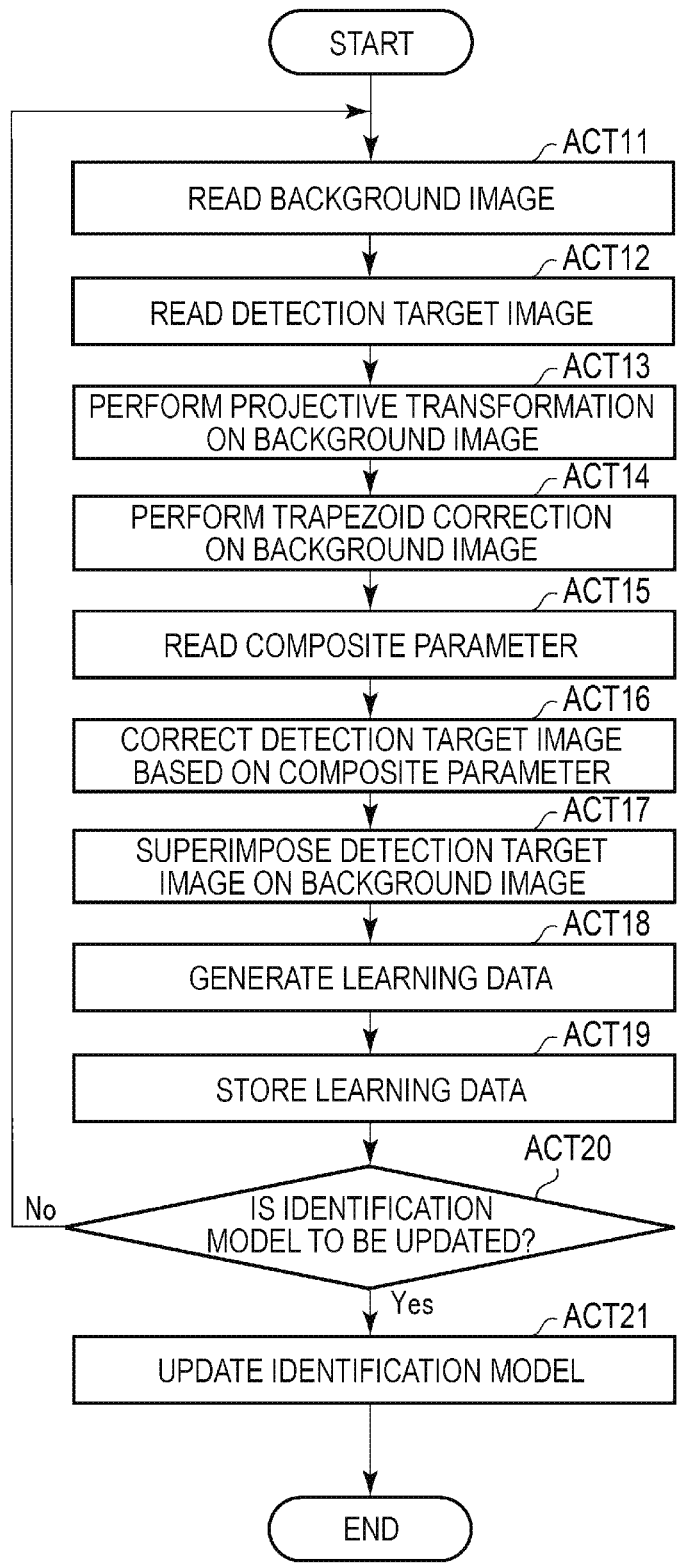
FIG. 8 is a flowchart for describing an example of an operation in a learning phase of the information processing apparatus according to the embodiment.

FIG. 8 is an explanatory diagram for describing the machine learning process in the information processing apparatus 23.

First, the processor 41 reads the background image from the memory 42 (ACT 11). The processor 41 reads the detection target image from the memory 42 (ACT 12). The processor 41 may be configured to read the background image and the detection target image from the memory 42 at random, or may be configured to read the background image and the detection target image selected by the operation interface 33 from the memory 42. The processor 41 may be configured to read one background image and a plurality of detection target images from the memory 42.

Figure 9:
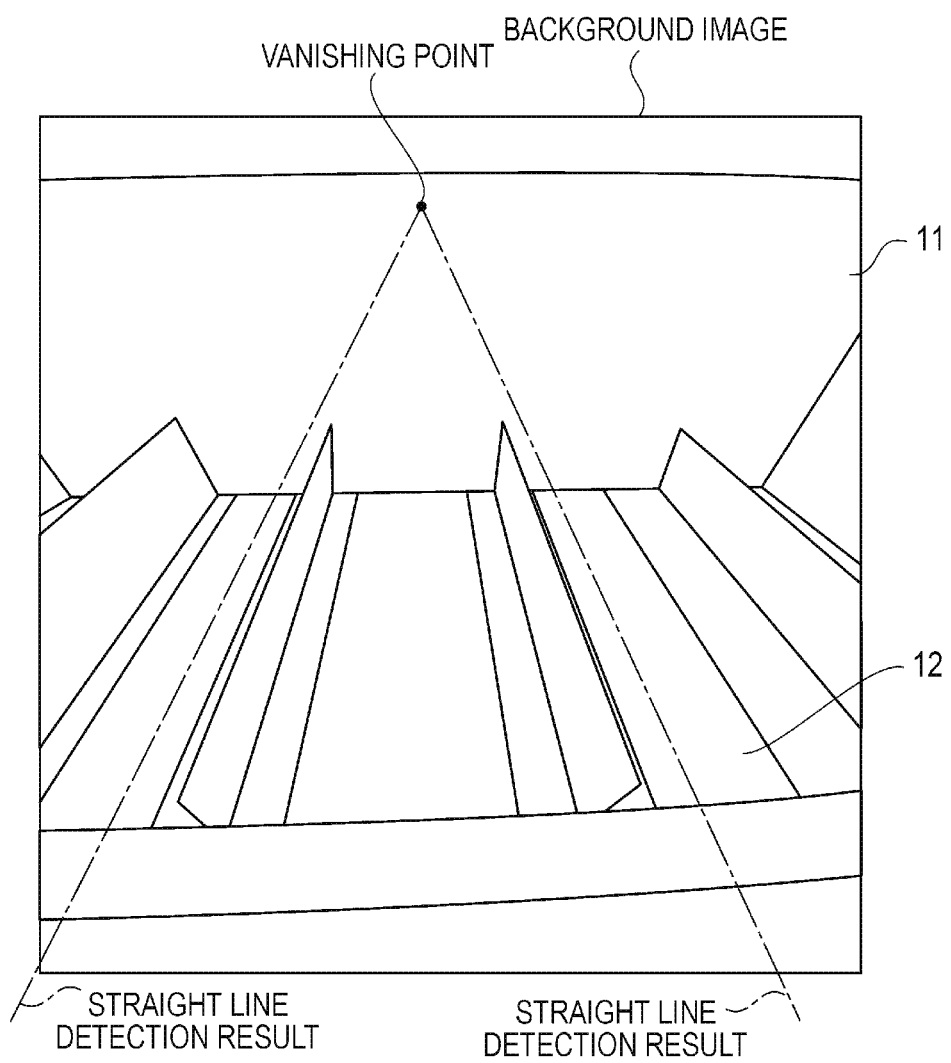
FIG. 9 is an explanatory diagram for describing an example of projective transformation of the background image according to the embodiment.

The processor 41 performs projective transformation that transforms the projection method for the read background image (ACT 13). For example, the processor 41 converts the background image of the first projection method (equidistant projection method) into an image of the second projection method (central projection method) which is the projection method for the detection target image. With this configuration, the processor 41 converts the background image illustrated in FIG. 4 into the background image illustrated in FIG. 9.

Figure 10:
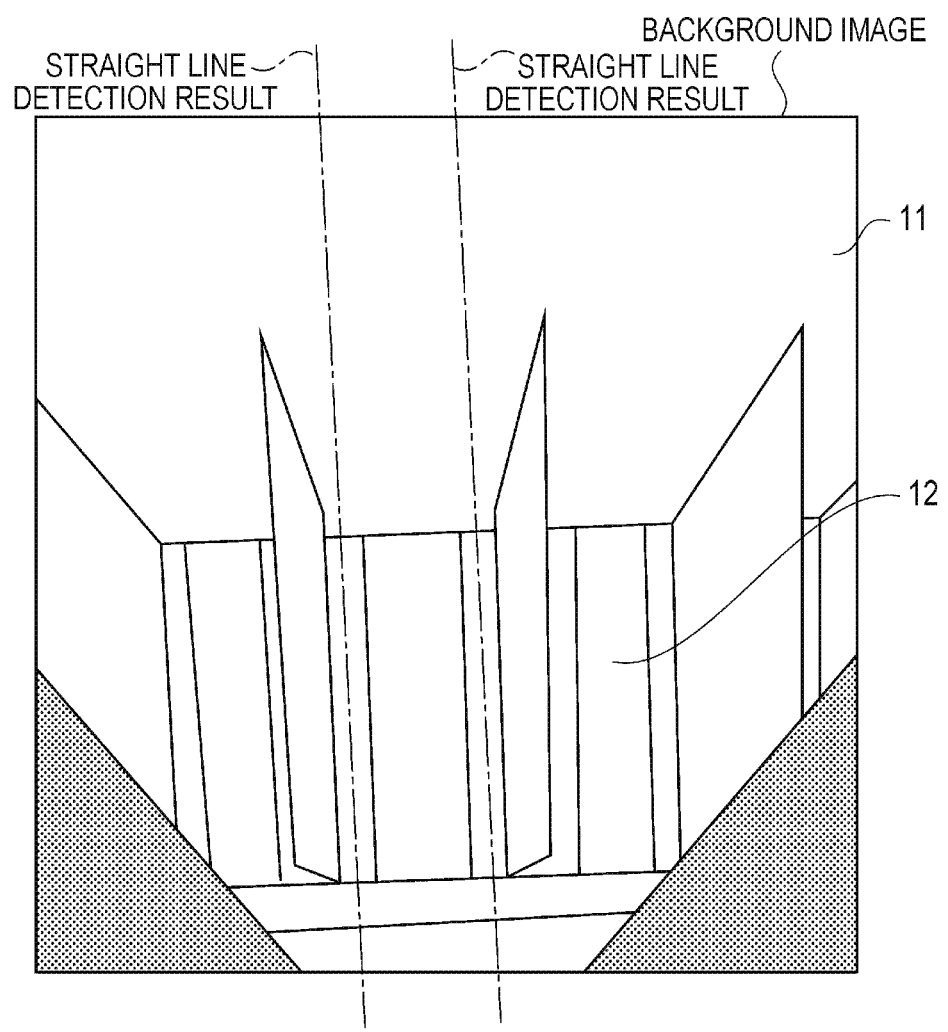
FIG. 10 is an explanatory diagram for describing an example of trapezoid correction of the background image according to the embodiment.

The processor 41 performs the trapezoid correction on the background image converted by being subjected to the central projection method (ACT 14). For example, the processor 41 detects a plurality of straight lines extending toward one vanishing point in the background image converted by being subjected to the central projection method. The processor 41 converts the background image illustrated in FIG. 9 into the background image illustrated in FIG. 10 based on the plurality of straight line detection results. The processor 41 may be configured to perform the trapezoid correction on the background image based on a preset parameter.

The processor 41 reads the composite parameter from the memory 42 (ACT 15). The composite parameter is a parameter used for image processing (processing such as enlargement and reduction, rotation, hue correction, brightness correction, contrast correction, and blurring) on the detection target image. The processor 41 corrects the detection target image based on the composite parameter (ACT 16). That is, the processor 41 performs image processing such as enlargement and reduction, rotation, hue correction, brightness correction, contrast correction, and blurring on the detection target image read in the ACT 12, based on the composite parameter read from the memory 42.

Furthermore, the composite parameter may include parameters used for image processing (processing such as hue correction, brightness correction, contrast correction, and blurring) on the background image. The processor 41 may perform image processing such as hue correction, brightness correction, contrast correction, and blurring on the background image in FIG. 10, based on the composite parameter read from the memory 42.

Figure 11:
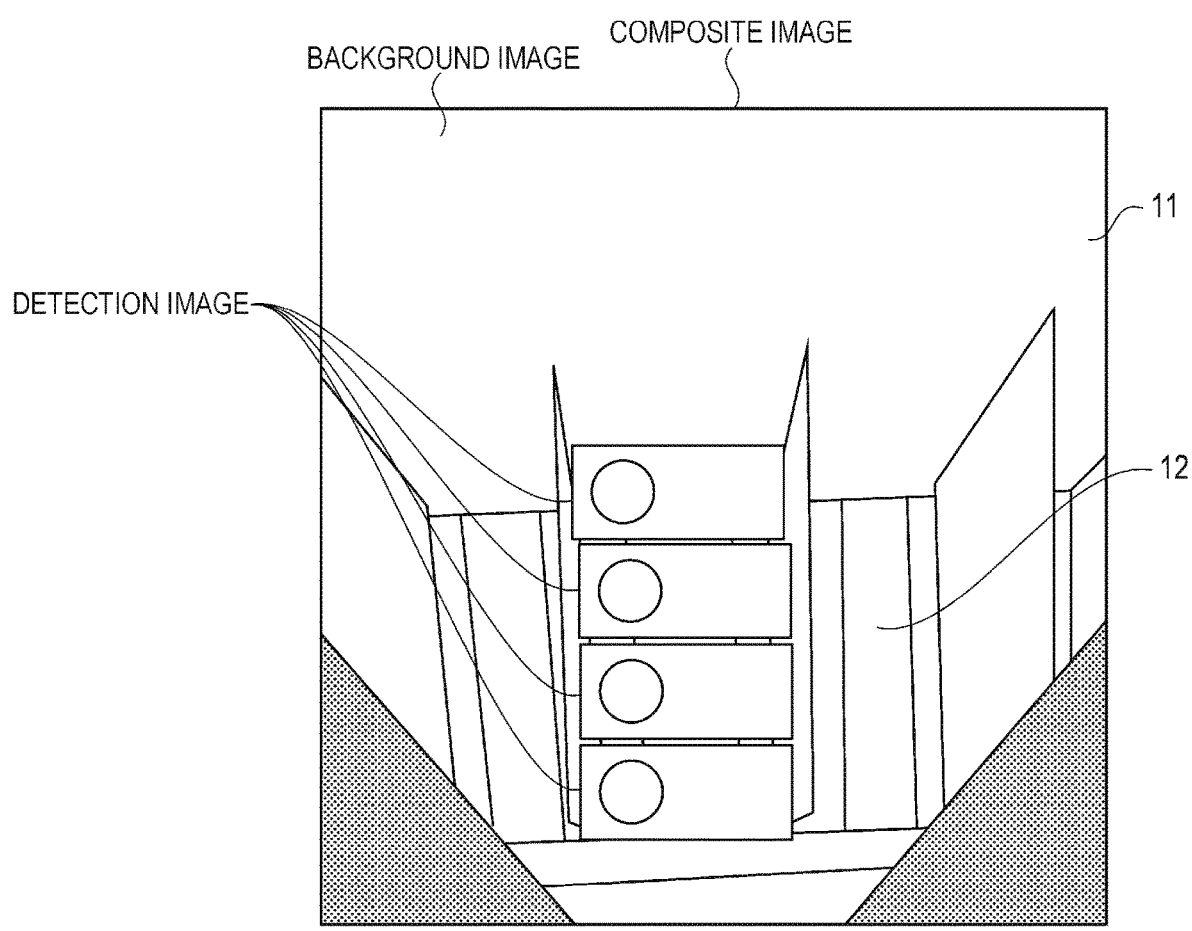
FIG. 11 is an explanatory diagram for describing an example of a composite image according to the embodiment.

Next, the processor 41 generates a composite image by superimposing the detection target image on the background image (ACT 17). That is, the processor 41 generates the composite image illustrated in FIG. 11 by superimposing the detection target image corrected in ACT 16 on the background image corrected in ACT 14. The number of detection target images to be superimposed on the background image may be one or plural. The number of detection target images to be superimposed on the background image may be a preset number or may be random. The position on the background image on which the detection target image is superimposed may be a preset position or may be random. The processor 41 may superimpose a plurality of types of detection target images on the background image.

Furthermore, the composite parameter may be information indicating a position (composite position) where the detection target image is superimposed on the background image, the number (composite number) of detection target images to be superimposed on the background image, whether or not superimposing of the detection target images on each other is allowed, and the like. In this case, the processor 41 determines the composite position where the detection target image is superimposed, the composite number, and whether or not the superimposing is allowed, based on the composite parameter.

The processor 41 generates learning data (ACT 18). The processor 41 generates the learning data based on the composite image, the position of the detection target image on the composite image, and the label information corresponding to the detection target image. That is, the question in the learning data is the composite image generated by superimposing the detection target image on the background image and the answer in the learning data is the position where the detection target image is superimposed on the background image and the label information corresponding to the detection target image. The processor 41 generates the learning data by using the position where the detection target image is superimposed on the composite image and the label information given to the superimposed detection target image as the answer in the learning data. The processor 41 stores the generated learning data in the memory 42 (ACT 19).

Next, the processor 41 determines whether or not to update the identification model (ACT 20). When it is determined not to update the identification model (NO in ACT 20), the processor 41 proceeds to the process of ACT 11 and continues to collect learning data. On the other hand, when it is determined to update the identification model (YES in ACT 20), the processor 41 updates the identification model based on the collected learning data (ACT 21), and ends the process. For example, when an identification model is not stored in the memory 42 and an arbitrary number of pieces of learning data are collected, the processor 41 generates an identification model and stores the identification model in the memory 42. The processor 41 updates the identification model stored in the memory 42 each time the arbitrary number of pieces of learning data are collected. The processor 41 may be configured to update the identification model stored in the memory 42 and then move to the process of ACT 11 to continuously collect learning data.

As described above, the information processing apparatus 23 includes the memory 42 storing the background image that does not include the detection target, the detection target image that is an image of the detection target, and the label information that indicates the detection target of the detection target image, and the processor 41. The processor 41 performs the trapezoid correction on the background image, and generates the composite image by superimposing the detection target image on the background image subjected to the trapezoid correction. The processor 41 generates learning data based on the composite image and the label information corresponding to the detection target image superimposed on the background image. With this configuration, even if the angle when capturing an image is different, the learning data can be generated based on the background image and the detection target image. Thus, the learning data used for machine learning can be easily collected. As a result, it is possible to easily generate a highly accurate identification model.

The processor 41 performs projective transformation on the background image by the same projection method as that for the detection target image, performs the trapezoid correction on the background image obtained by being subjected to the projective transformation, and uses the background image for generating a composite image. With this configuration, even if the projection method at the time of capturing an image is different, learning data can be generated based on the background image and the detection target image. Thus, learning data used for machine learning can be easily collected.

The processor 41 corrects the detection target image based on a preset composite parameter and generates a composite image by superimposing the corrected detection target image on the background image. With this configuration, it is possible to generate a composite image in which differences in orientation, image size, hue, brightness, contrast, and the like between the detection target image and the background image are corrected. Thus, the learning data used for machine learning can be easily collected.

Next, the operation of the information processing apparatus 23 in the inference phase will be described.

As described above, in the inference phase, the information processing apparatus 23 performs the labeling process for identifying the commodity 3 which is the detection target from the identification target image acquired by the commodity shelf imaging device 21, based on the identification model generated in advance.

Figure 12:
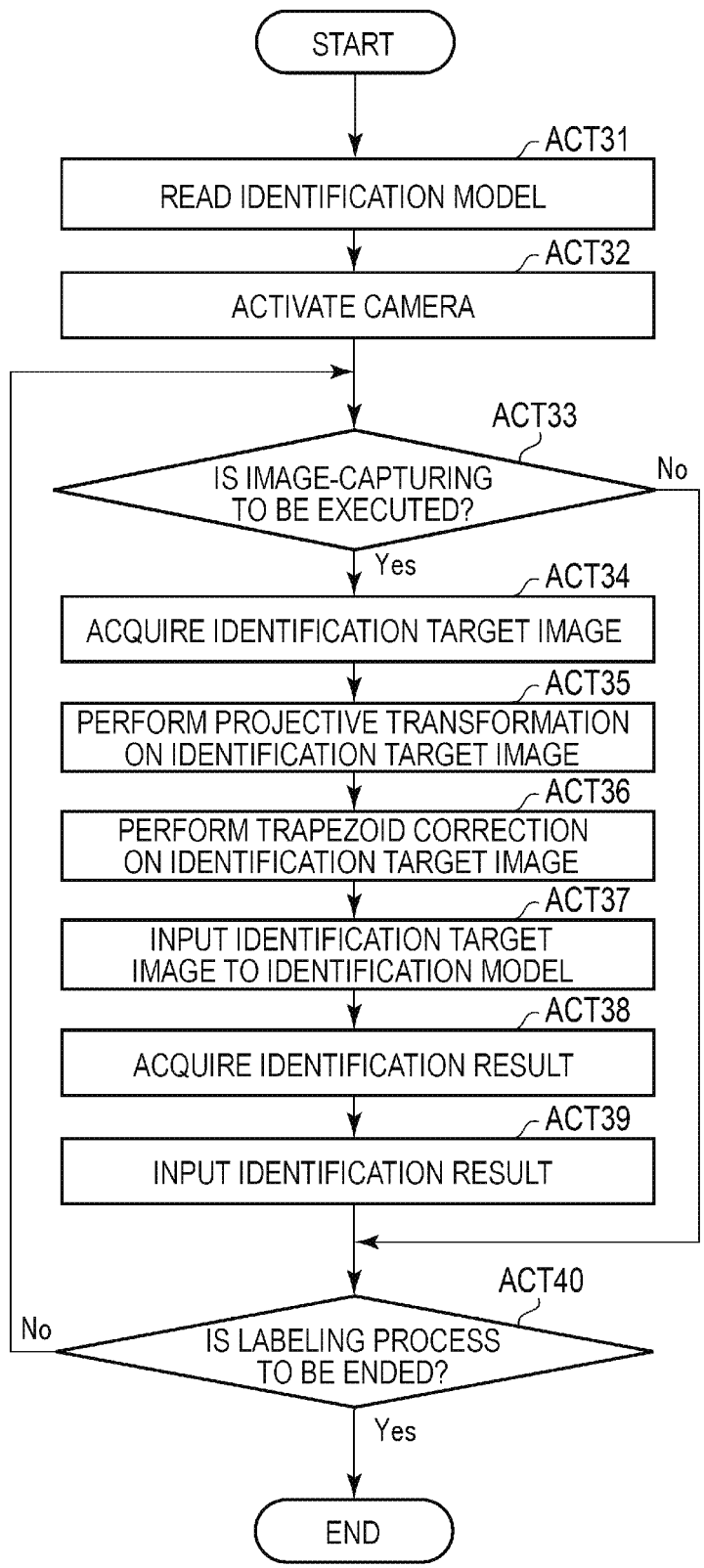
FIG. 12 is a flowchart for describing an example of an operation in an inference phase of the information processing apparatus according to the embodiment.

FIG. 12 is an explanatory diagram for describing the labeling process in the information processing apparatus 23.

First, the processor 41 reads the identification model from the memory 42 (ACT 31). The processor 41 activates the camera, that is, the commodity shelf imaging device 21 (ACT 32). The processor 41 determines whether or not to cause the commodity shelf imaging device 21 to execute image-capturing (ACT 33). When it is determined to cause the commodity shelf imaging device 21 to execute image-capturing (YES in ACT 33), the processor 41 causes the commodity shelf imaging device 21 to execute image-capturing and acquires, for example, the identification target image illustrated in FIG. 5 (ACT 34). When it is determined not to cause the commodity shelf imaging device 21 to execute image-capturing (NO in ACT 33), the processor 41 proceeds to the process of ACT 40 described later.

For example, the processor 41 determines to cause the commodity shelf imaging device 21 to execute imaging-capturing at a preset time. The processor 41 may be configured to determine that the commodity shelf imaging device 21 is caused to execute imaging-capturing at every preset time interval. The processor 41 may be configured to determine that the commodity shelf imaging device 21 is caused to execute imaging-capturing based on the detection result of another sensor (for example, a human sensor). The processor 41 may be configured to cause the commodity shelf imaging device 21 to continuously execute image-capturing and use a part of the continuously acquired image as the identification target image.

The processor 41 performs projective transformation on the acquired identification target image (ACT 35). The processor 41 converts the acquired identification target image of the first projection method (equidistant projection method) into an image of the second projection method (central projection method), which is the image projection method used to generate the identification model.

The processor 41 performs the trapezoid correction on the identification target image converted by being subjected to the central projection method (ACT 36). For example, the processor 41 detects a plurality of straight lines extending toward one vanishing point in the identification target image converted by being subjected to the central projection method. The processor 41 performs the trapezoid correction based on a plurality of straight line detection results. The processor 41 may be configured to perform the trapezoid correction on the background image, based on the preset parameter.

Figure 13:
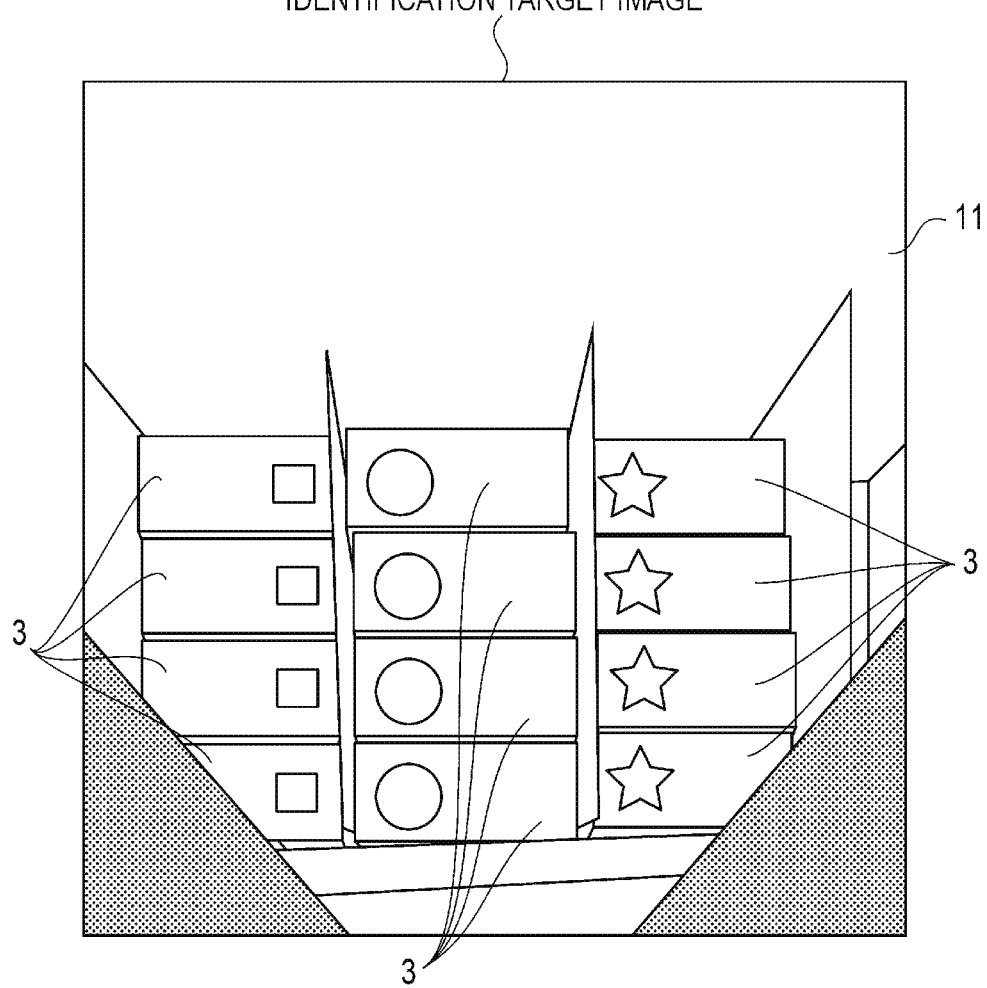
FIG. 13 is an explanatory diagram for describing an example of projective transformation and trapezoid correction of an identification target image according to the embodiment.

By the processes of ACT 35 and ACT 36 described above, the processor 41 converts the identification target image obtained by the equidistant projection method illustrated in FIG. 5 into the identification target image illustrated in FIG. 13 converted by being subjected to the central projection method and subjected to the trapezoid correction. In the identification target image illustrated in FIG. 13, the face of the commodity 3 that is the detection target is projected in the same state as the detection target image.

Figure 14:
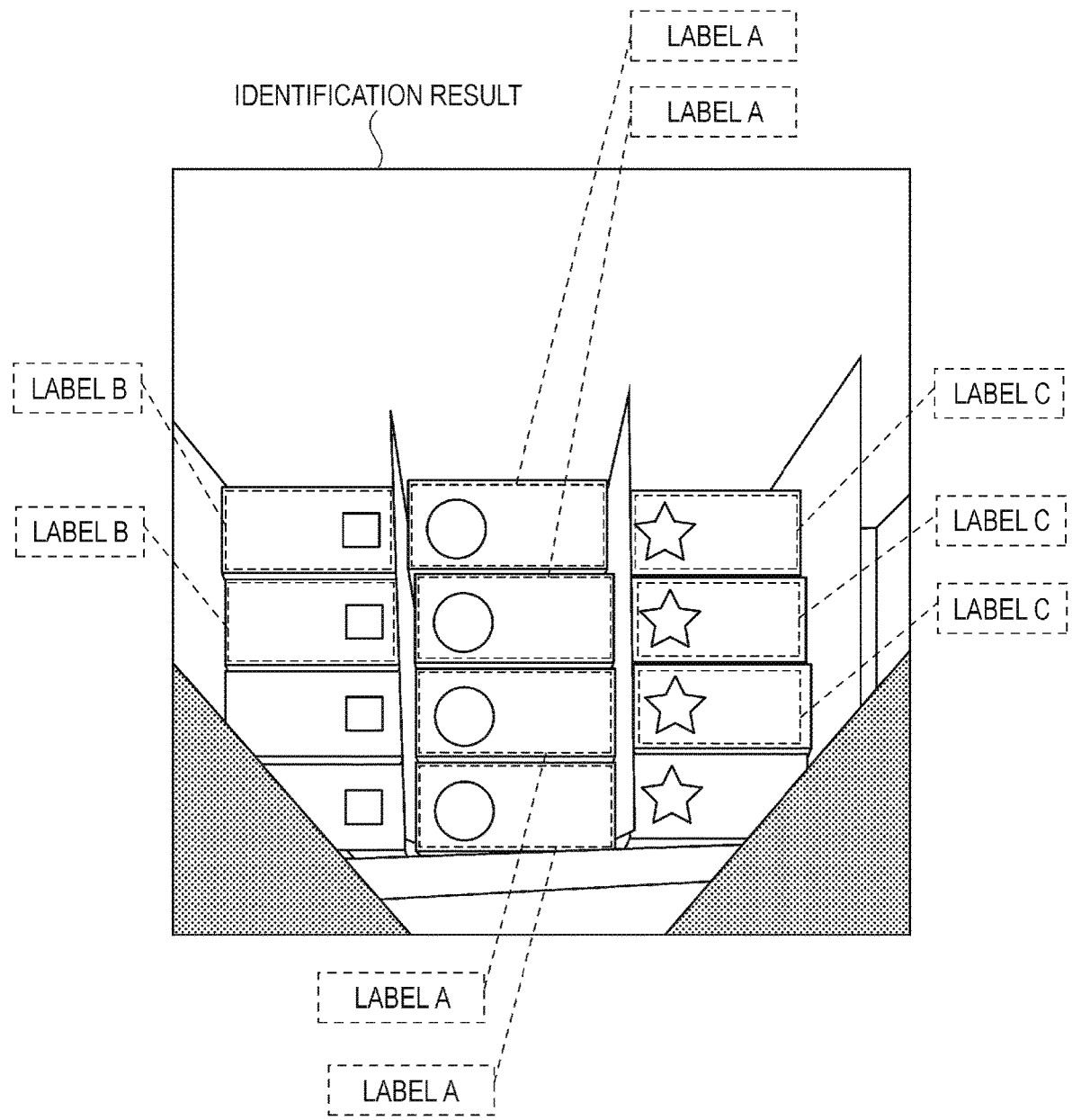
FIG. 14 is an explanatory diagram for describing an example of an identification result by the information processing apparatus according to the embodiment.

The processor 41 inputs the identification target image subjected to the projective transformation and trapezoid correction to the identification model (ACT 37). With this configuration, an identification result as illustrated in FIG. 14 to which the label information is given is acquired for each area in which the face of the commodity 3 which is the detection target on the identification target image is projected (ACT 38). In the identification result of FIG. 14, one piece of label information is given to each face area of the detected commodity 3. The identification result may be obtained by giving information indicating reliability for each label information to each face area of the detected commodity 3. That is, a configuration in which reliabilities for the respective pieces of label information for a certain area A are "label A=0.8", "label B=0.05", and "label C=0.02" may be adopted, and a configuration in which reliabilities for the respective pieces of label information for a certain area B are "label A=0.01", "label B=0.05", and "label C=0.9" may be adopted.

The processor 41 outputs the acquired identification result (ACT 39), and determines whether or not to end the labeling process (ACT 40). When it is determined not to end the labeling process (NO in ACT 40), the processor 41 proceeds to the process of ACT 33, acquires a new identification target image, and continues the labeling process. When it is determined to end the labeling process (YES in ACT 40), the processor 41 ends the labeling process.

As described above, the information processing apparatus 23 functioning as an article identification apparatus includes the memory 42 storing a background image not including a detection target, a detection target image which is an image of the detection target, and label information indicating the detection target of the detection target image and the processor 41. The processor 41 performs trapezoid correction on the background image and generates a composite image by superimposing the detection target image on the background image subjected to the trapezoid correction. The processor 41 generates learning data based on the composite image and the label information corresponding to the detection target image superimposed on the background image. Furthermore, the processor 41 generates an identification model based on the learning data. With this configuration, the information processing apparatus 23 can easily generate a highly accurate identification model.

The processor 41 identifies the commodity 3 which is the detection target in the identification target image, based on the identification target image in which the detection target is projected and the identification model. By identifying the commodity 3 which is the detection target in the identification target image using the identification model generated in this way, the detection target can be detected from the identification target image with high accuracy.

The information processing apparatus 23 described above may be configured to detect anything as long as it can be counted and its number increases or decreases within a predetermined time. For example, the information processing apparatus 23 can be applied to a system (shelf management system) for confirming the checkout and replenishment status of commodities in a store. For example, the information processing apparatus 23 can be applied to a system that detects fruits and vegetables, packaged goods (boxes or bags), beverages (cans, bottles, or boxes), shoppers, shop assistants, and the like from images in a supermarket. For example, the information processing apparatus 23 can be applied to a system that detects commodities, shoppers, shop assistants, and the like from an image in a specialty store. For example, the information processing apparatus 23 can be applied to a system that detects food and drinks, tableware (plates, glasses, chopsticks), restaurant customers, restaurant staff, and the like from an image in a restaurant.

The information processing apparatus 23 can be applied to a system (inspection system) for confirming entry and exit of articles in a distribution warehouse. For example, the information processing apparatus 23 can be applied to a system that detects cardboard, containers (cage), vehicles (lifts or trucks), a person, and the like from an image in a distribution warehouse.

The information processing apparatus 23 can be applied to a picking system at a manufacturing site. For example, the information processing apparatus 23 can be applied to a system that detects parts, tools, a robot (assembly or picking), a vehicle (lift or truck), a person, and the like from an image at a manufacturing site.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a memory that stores a detection target image that is an image of a detection target, label information that indicates the detection target of the detection target image, and a background image that does not include the detection target; and
a processor that performs trapezoid correction on the background image, generates a composite image by superimposing the detection target image on the background image subjected to the trapezoid correction, and generates learning data based on the composite image and the label information.

2. The apparatus according to claim 1, wherein
the processor further performs projective transformation on the background image by the same projection method as that for the detection target image, and performs the trapezoid correction on the background image obtained by being subjected to the projective transformation.

3. The apparatus according to claim 1, wherein
the processor corrects the detection target image based on a preset composite parameter and generates the composite image by superimposing the corrected detection target image on the background image.

4. The apparatus according to claim 3, wherein
the preset composite parameter comprises at least one of hue correction, brightness correction, contrast correction, and blurring.

5. The apparatus according to claim 1, wherein
the processor generates the learning data by associating an area of the detection target in the composite image with label information corresponding to the detection target.

6. The apparatus according to claim 1, wherein
the detection target comprises a commodity for sale.

7. The apparatus according to claim 1, wherein
the detection target comprises a shopper within a store.

8. An article identification apparatus, comprising:
a memory that stores a detection target image that is an image of a detection target, label information that indicates the detection target of the detection target image, and a background image that does not include the detection target; and
a processor that performs trapezoid correction on the background image, generates a composite image by superimposing the detection target image on the background image subjected to the trapezoid correction, generates learning data based on the composite image and the label information, generates an identification model based on the generated learning data, and identifies the detection target in an identification target image based on the identification target image in which the detection target is projected and the identification model.

9. The apparatus according to claim 8, wherein
the processor further performs projective transformation on the background image by the same projection method as that for the detection target image, and performs the trapezoid correction on the background image obtained by being subjected to the projective transformation.

10. The apparatus according to claim 9, wherein
the processor performs projective transformation on the identification target image by the same projection method as that for the detection target image, performs trapezoid correction on the identification target image obtained by being subjected to the projective transformation, and identifies the detection target in the identification target image based on the identification target image subjected to the trapezoid correction and the identification model.

11. The apparatus according to claim 8, wherein
the processor corrects the detection target image based on a preset composite parameter, and generates the composite image by superimposing the corrected detection target image on the background image.

12. The apparatus according to claim 8, wherein
the preset composite parameter comprises at least one of hue correction, brightness correction, contrast correction, and blurring.

13. The apparatus according to claim 8, wherein
the processor generates the learning data by associating an area of the detection target in the composite image with label information corresponding to the detection target.

14. The apparatus according to claim 8, wherein
the detection target comprises a commodity for sale.

15. An article identification system, comprising:
an imaging device that captures an identification target image in which a detection target is projected and supplies the identification target image to an article identification apparatus; and
the article identification apparatus comprising:
a memory that stores a detection target image that is an image of a detection target, label information that indicates the detection target of the detection target image and a background image that does not include the detection target, and
a processor that performs trapezoid correction on the background image, generates a composite image by superimposing the detection target image on the background image subjected to the trapezoid correction, generates learning data based on the composite image and the label information, generates an identification model based on the generated learning data, and identifies the detection target in the identification target image based on the identification target image in which the detection target is projected and the identification model.

16. The system according to claim 15, wherein the imaging device is a commodity shelf imaging device.

17. The system according to claim 15, wherein the processor further performs projective transformation on the background image by the same projection method as that for the detection target image, and performs the trapezoid correction on the background image obtained by being subjected to the projective transformation.

18. The system according to claim 17, wherein the processor performs projective transformation on the identification target image by the same projection method as that for the detection target image, performs trapezoid correction on the identification target image obtained by being subjected to the projective transformation, and identifies the detection target in the identification target image based on the identification target image subjected to the trapezoid correction and the identification model.

19. The system according to claim 15, wherein the processor corrects the detection target image based on a preset composite parameter, and generates the composite image by superimposing the corrected detection target image on the background image.

20. The system according to claim 15, wherein the processor generates the learning data by associating an area of the detection target in the composite image with label information corresponding to the detection target.

* * * * *